United States Patent
Kawaai

(10) Patent No.: US 10,948,010 B2
(45) Date of Patent: Mar. 16, 2021

(54) BEARING DEVICE AND ROTATING MACHINE USING THE SAME

(71) Applicant: DAIDO METAL COMPANY LTD., Nagoya (JP)

(72) Inventor: Yuji Kawaai, Inuyama (JP)

(73) Assignee: DAIDO METAL COMPANY LTD., Nagoya (JP)

(*) Notice: Subject to any disclaimer, the term of this patent is extended or adjusted under 35 U.S.C. 154(b) by 0 days.

(21) Appl. No.: 16/521,667

(22) Filed: Jul. 25, 2019

(65) Prior Publication Data
US 2020/0032843 A1     Jan. 30, 2020

(30) Foreign Application Priority Data
Jul. 27, 2018   (JP) .............................. JP2018-141326

(51) Int. Cl.
*F16C 17/06*   (2006.01)
*F16C 23/04*   (2006.01)

(52) U.S. Cl.
CPC ............ *F16C 17/06* (2013.01); *F16C 23/048* (2013.01)

(58) Field of Classification Search
CPC ........ F16C 17/06; F16C 23/04; F16C 23/048; F16C 21/00; F16C 2380/26; F16C 13/02; F16C 17/065; F16C 17/08
See application file for complete search history.

(56) References Cited

U.S. PATENT DOCUMENTS

| | | | | | |
|---|---|---|---|---|---|
| 1,229,291 | A | * | 6/1917 | Kingsbury | ............. F16C 17/06 384/308 |
| 1,265,334 | A | * | 5/1918 | Howarth | ................. F16C 17/06 384/308 |
| 1,445,188 | A | * | 2/1923 | Wadsworth | ............. F16C 17/06 384/308 |
| 1,696,667 | A | * | 12/1928 | Brown | .................... F16C 17/06 384/308 |

(Continued)

FOREIGN PATENT DOCUMENTS

| | | |
|---|---|---|
| GB | 2341210 A | 3/2000 |
| JP | S57137715 A | 8/1982 |

(Continued)

OTHER PUBLICATIONS

United Kingdom Search Report dated Dec. 24, 2019, for United Kingdom Patent Application No. GB1910685.5.

*Primary Examiner* — Alan B Waits
(74) *Attorney, Agent, or Firm* — Karceski IP Law, PLLC

(57) ABSTRACT

A bearing device includes a base plate, a plurality of sliding pads and support members. The sliding pad is movable relative to the base plate. The support members are located between the base plate and the sliding pad, and shift a position of a load supporting point in a circumferential direction of the base plate, the load supporting point serving as a point for supporting a load received from the sliding pad. When any virtual flat surface perpendicular to a rotating shaft member is considered as a reference surface, and when a distance from the reference surface through the load supporting point to an end of the sliding pad at the opposite side to the base plate is defined as a setting distance, a position of the load supporting point is shifted in a circumferential direction of the base plate with no change in the setting distance.

8 Claims, 11 Drawing Sheets

(56) References Cited

U.S. PATENT DOCUMENTS

| | | | | |
|---|---|---|---|---|
| 3,544,177 A | * | 12/1970 | Sibley | F16C 17/06 |
| | | | | 384/302 |
| 3,586,401 A | * | 6/1971 | Gravelle | F16C 17/03 |
| | | | | 384/308 |
| 2017/0152888 A1 | * | 6/2017 | Kawaai | F04D 29/041 |

FOREIGN PATENT DOCUMENTS

| | | | |
|---|---|---|---|
| JP | H05296236 A | 11/1993 | |
| JP | H10213131 A | 8/1998 | |

* cited by examiner

BEARING DEVICE AND ROTATING MACHINE USING THE SAME

CROSS-REFERENCE TO RELATED APPLICATIONS

This application claims the benefit of and priority to Japanese Patent Application No. 2018-141326, filed on Jul. 27, 2018, the entire content of which is incorporated herein by reference.

FIELD OF THE INVENTION

The present embodiment relates to a bearing device and a rotating machine using the bearing device.

DESCRIPTION OF THE RELATED ART

A rotating machine such as a motor or a power generator is provided with a bearing device for supporting a rotating shaft member integral with a rotor. The bearing device includes a thrust bearing for axially bearing the rotating shaft member, a journal bearing for radially supporting the rotating shaft member, and the like. Such a bearing device is provided with a sliding pad making contact with a collar provided in the rotating shaft member. In a case of Japanese Patent Laid-Open No. 5-296236, a member called a pivot is disposed on the backside of the sliding pad. In this way, Japanese Patent Laid-Open No. 5-296236 accommodates rotation in the forward direction and in the backward direction.

In the case of Japanese Patent Laid-Open No. 5-296236, however, when the pivot moves, a height of the sliding pad, that is, a distance to the collar provided in the rotating shaft member changes. Accordingly, in a case of a bearing device where a plurality of sliding pads are arranged in a circumferential direction of the rotating shaft member, a distance to the collar differs for each of the sliding pads. When the distance to the collar differs for each of the sliding pads in this way, loads to be applied to the sliding pads become ununiform, possibly causing the seizure.

SUMMARY OF THE INVENTION

Therefore, an object of the present invention is to provide a bearing device configured to cause loads to be applied to sliding pads to become uniform with no change in height of the sliding pad and to accommodate rotation in a forward direction and in a backward direction, and a rotating machine using the bearing device.

For solving the problem, a bearing device according to the present invention, includes a base plate, a plurality of sliding pads and a support member. The sliding pads are located in the base plate and are movable relative to the base plate in a circumferential direction of a rotating shaft member. The support member is located between the base plate and the sliding pad, and shifts a position of a load supporting point in a circumferential direction of the base plate, the load supporting point serving as a point for supporting a load received from the sliding pad.

Here, when any virtual flat surface perpendicular to the rotating shaft member is considered as a reference surface, and when a distance from the reference surface through the load supporting point to an end of the sliding pad at the opposite side to the base plate is defined as a setting distance, a position of the load supporting point is shifted in the circumferential direction of the base plate with no change in the setting distance.

As a result, in the bearing device of the present embodiment the position of the load supporting point is shifted in the circumferential direction to make the position of the load supporting point of the sliding pad in the rotation in the forward direction differ from the position of the load supporting point of the sliding pad in the rotation in the backward direction. In other words, the position of the load supporting point of the sliding pad changes with the rotating direction. Accordingly, the sliding pad creates an appropriate inclination in response to the rotating direction and a stable oil film of lubricating oil is formed between the sliding pad and the rotating shaft member as an opposite member. Even when the position of the load supporting point by the support member changes in the bearing device of the present embodiment, the setting distance, that is, the distance to the opposite member does not change. Accordingly, it is possible to accommodate the rotation in the forward direction and in the backward direction while causing the load to be applied to the sliding pad to be uniform.

In the bearing device of the present embodiment the support member comprises a pair of support members respectively arranged closer to end sides than a center of the sliding pad in the circumferential direction of the rotating shaft member.

Consequently, one of the pair of support members serves as a load supporting point in the rotation in the forward direction, and the other serves as a load supporting point in the rotation in the backward direction. Accordingly, it is possible to form a stable oil film in response to the rotation in the forward direction and in the backward direction with a simple configuration.

In the bearing device of the present embodiment, the base plate includes a recessed part on a surface on the sliding pad side, any one of the pair of the support members being allowed to enter the recessed part by a relative movement of the sliding pad to the base plate.

In this way, by forming the recessed part on the base plate, any one of the pair of the support members enters the recessed part. At that time, the other support member not entering the recessed part serves as the load supporting point of the sliding pad. When the sliding pad moves with a change in the rotating direction, one of the pair of the support members enters the recessed part and the other is positioned outside of the recessed part. When the support member that does not serve as the load supporting point enters the recessed part, the setting distance becomes constant regardless of the movement of the load supporting point following the change in the rotating direction. Accordingly, it is possible to accommodate the rotation in the forward direction and in the backward direction while causing the load to be applied to the sliding pad to be uniform.

In the bearing device of the present embodiment, in the relative movement direction between the base plate and the sliding pad, when a distance equivalent to half a movement distance of the sliding pad from a position where a center of the sliding pad coincides with a center of the recessed part until any one of the support members enters the recessed part is defined as an offset amount E, an interval A between the support members in the circumferential direction of the rotating shaft member and a width C of the recessed part in the circumferential direction of the rotating shaft member preferably satisfy a relation of $0<(A-2E)<C<A$.

In this way, the load supporting point of the support member can be appropriately secured in response to the rotating direction.

In the bearing device of the present embodiment, the support member is formed of a pair of roller members located between the base plate and the sliding pad.

The support member formed of the roller members smoothly guides the sliding pad when a direction of a frictional force to be applied to the sliding pad by a change in the rotating direction changes. Accordingly, it is possible to easily change the load supporting point in response to the rotating direction.

The bearing device of the present embodiment further includes a retaining member that rotatably supports both ends of the pair of the roller members in a radial direction of the rotating shaft member and retains a relative position of the pair of the roller members.

With this structure, a positional relation of the pair of the roller members defining the support members can be retained to be constant.

In the bearing device of the present embodiment, the support member includes a pair of slide members located on the base plate side of the sliding pad.

The support member formed of the slide member smoothly guides the sliding pad to change the load supporting point when a direction of a frictional force to be applied to the sliding pad changes with a change in the rotating direction. Accordingly, it is possible to easily change an inclination of the sliding pad in response to the rotating direction.

The bearing device of the present embodiment further includes a positioning member for retaining a positional relation between the base plate, the sliding pad and the support member.

In this way, the positional relation between the base plate, the sliding pad and the support member is appropriately maintained. Accordingly, even when the sliding pad moves in the circumferential direction with the change in the rotating direction, the position of the load supporting point of the sliding pad can be appropriately maintained.

It is preferable that the bearing device of the present embodiment further includes a limiting part that is provided in the base plate to limit an excessive movement of the sliding pad. In this way, a positional relation between the support member and the recessed part can be appropriately maintained.

The bearing device of the present embodiment includes a thrust bearing for supporting the rotating shaft member in an axial direction of the rotating shaft member.

A rotating machine of the present embodiment includes the bearing device as described herein, and a rotor rotating integrally with the rotating shaft member.

In this way, even the rotating machine the rotating direction of which changes can reduce the seizure caused by non-uniformization of the load while supporting.

DESCRIPTION OF EMBODIMENT(S) OF THE INVENTION

Hereinafter, a plurality of embodiments in relation to a bearing device will be explained based on the drawings. Components substantially in common to those in the plurality of embodiments are given identical reference signs, and the explanation is omitted.

First Embodiment

Figure 2:
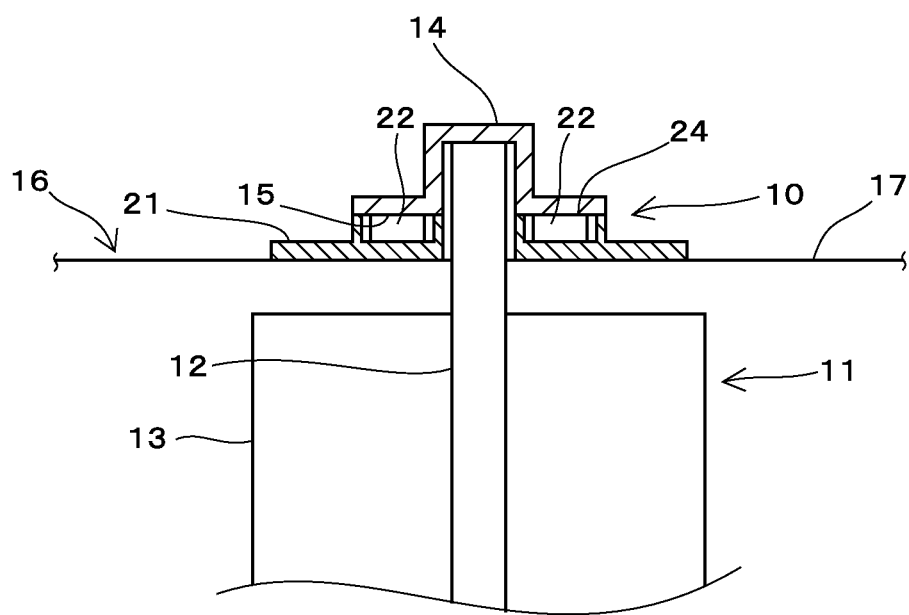
FIG. 2 is a schematic cross section illustrating a rotating machine to which the bearing device according to the first embodiment is applied.

A bearing device 10 illustrated in FIG. 2 is used as a bearing in a rotating machine 11. The bearing device 10 in the present embodiment is a thrust bearing for supporting the rotating machine 11 axially. The rotating machine 11 is a device such as a power generator, a pump and a turbine, rotating around a rotating shaft member 12. The rotating machine 11 is not limited to these examples, but can be composed of any device rotating around the rotating shaft member 12. The rotating machine 11 is provided with the rotating shaft member 12 as the center of rotation, and a rotor 13. The rotor 13 rotates together with the rotating shaft member 12. The rotating shaft member 12 has a collar member 14. The collar member 14 rotates together with the rotating shaft member 12, and is positioned in a radial outer side of the rotating shaft member 12. The collar member 14 has a sliding surface 15 sliding with the bearing device 10 at an axial end to face the bearing device 10. In a case of the present embodiment, the rotating shaft member 12 extends substantially upward and downward in a gravity direction.

The bearing device 10 in the present embodiment is fixed to a floor 17 of a facility 16 and supports the rotating machine 11 in a suspending state. The bearing device 10 may be configured to support the rotating machine 11 from a lower end side of the rotating shaft member 12. The bearing device 10 is configured to support the rotating machine 11 where an axial direction of the rotating shaft member 12 extends in a direction different from the gravity direction, for example, in a horizontal direction.

Figure 1:
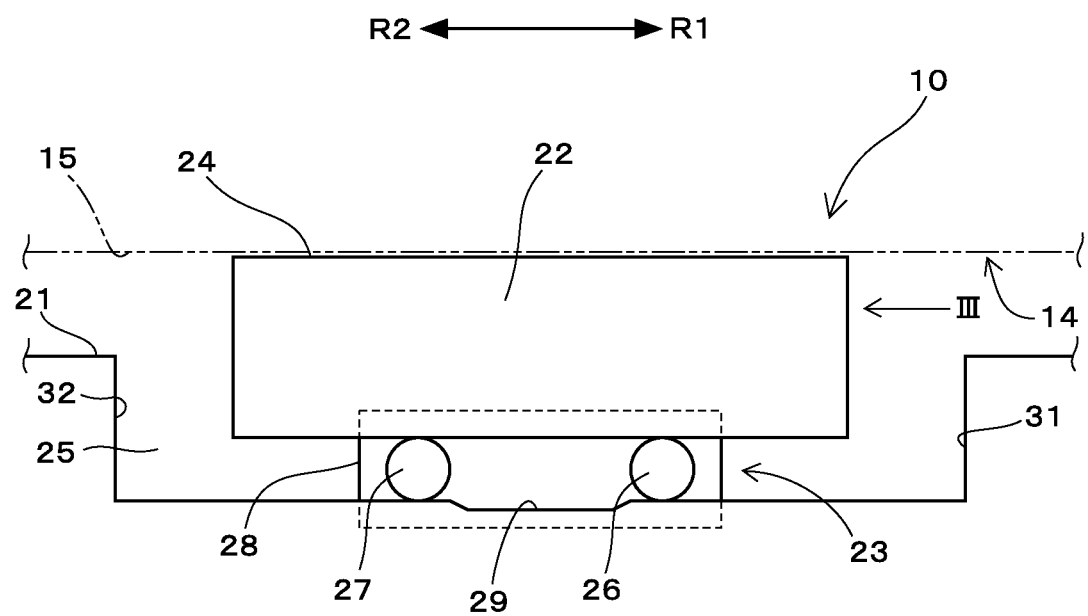
FIG. 1 is a schematic diagram illustrating an essential part of a bearing device according to a first embodiment as viewed from an outer peripheral side of a base plate.
Figure 3:
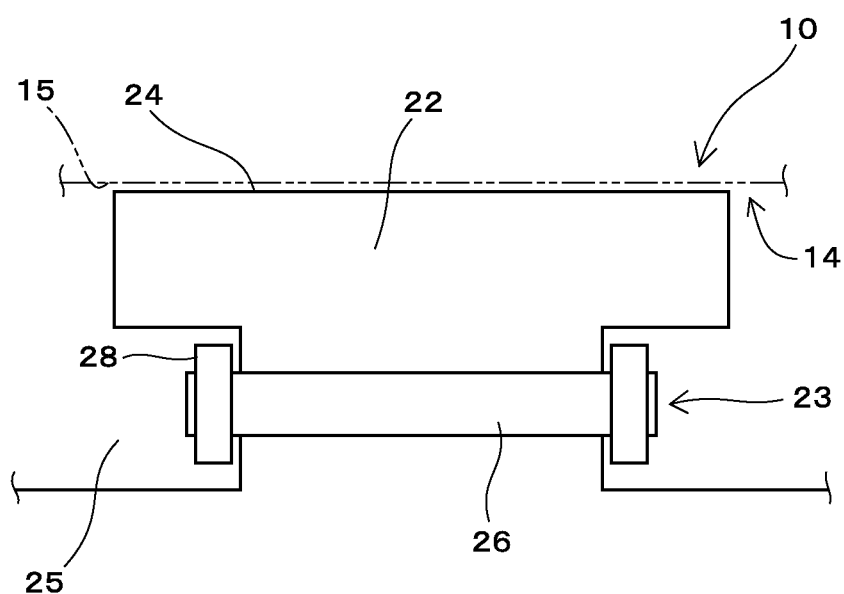
FIG. 3 is a schematic diagram as viewed in the direction of arrow III in FIG. 1.
Figure 4:
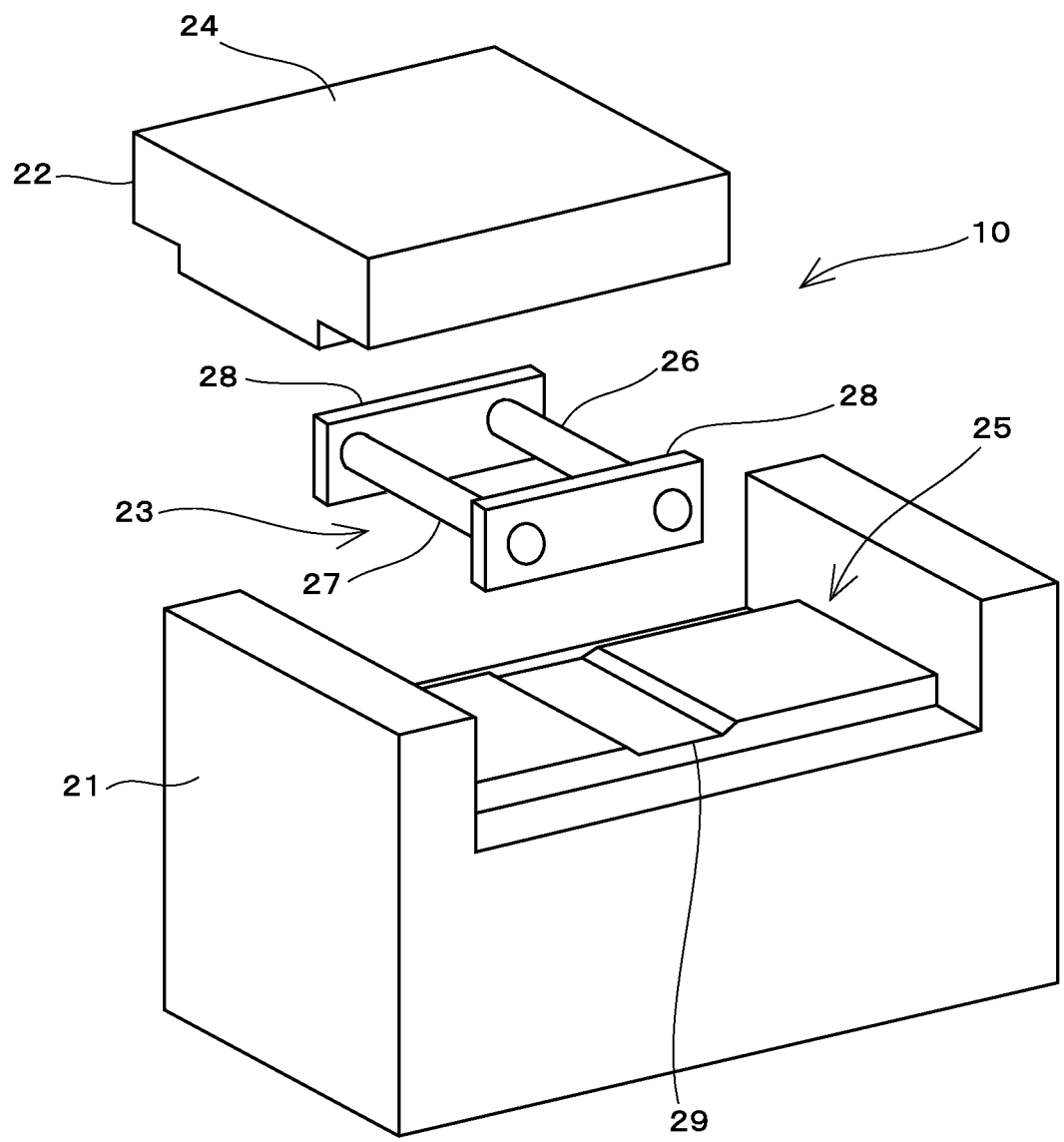
FIG. 4 is a schematic perspective view illustrating the essential part of the bearing device according to the first embodiment.

The bearing device 10 is provided with a base plate 21, a sliding pad 22 and a support member 23 as illustrated in FIG. 1, FIG. 3 and FIG. 4. The base plate 21 is fixed to the floor 17 of the facility 16 as illustrated in FIG. 2. In other words, the base plate 21 defines a base of the bearing device 10. The base plate 21 is located annularly in the circumferential direction of the rotating shaft member 12 in the radial outer side of the rotating shaft member 12. In other words, the base plate 21 is located on a circle concentric with the rotating shaft member 12.

In a case of the present embodiment, the sliding pad 22 is located above the base plate 21 in the gravity direction as illustrated in FIG. 1, FIG. 3 and FIG. 4. The sliding pad 22 comprises a plurality of sliding pads in the circumferential direction of the rotating shaft member 12 above the base plate 21. The sliding pad 22 can move relative to the base plate 21 in the circumferential direction. The sliding pad 22 has an upper end surface 24 at the opposite side to the base plate 21, the upper end surface 24 sliding on the sliding surface 15 of the collar member 14 rotating together with the rotating shaft member 12. The sliding pad 22 slides on the sliding surface 15 of the collar member 14 to rotatably support the rotating machine 11 axially. The sliding pad 22 is accommodated in an accommodation room 25 formed in the base plate 21. The accommodation room 25 includes a plurality of accommodation rooms in accordance with the number of the sliding pads 22 in the circumferential direction of the base plate 21. The accommodation room 25 is formed to be recessed from an end of the base plate 21 on the collar member 14-side to the opposite side. The bearing device 10, including a portion between the collar member 14 and the sliding pad 22, is lubricated by a lubricant having viscosity. The sliding pad 22 is formed of steel, for example, and may have a layer of an alloy such as a white metal or a coating layer such as a resin in the sliding surface 15-side. For example, in a case where the rotating shaft member 12 extends in the horizontal direction, the sliding pad 22 is located to be neighbored to the base plate 21.

Figure 5:
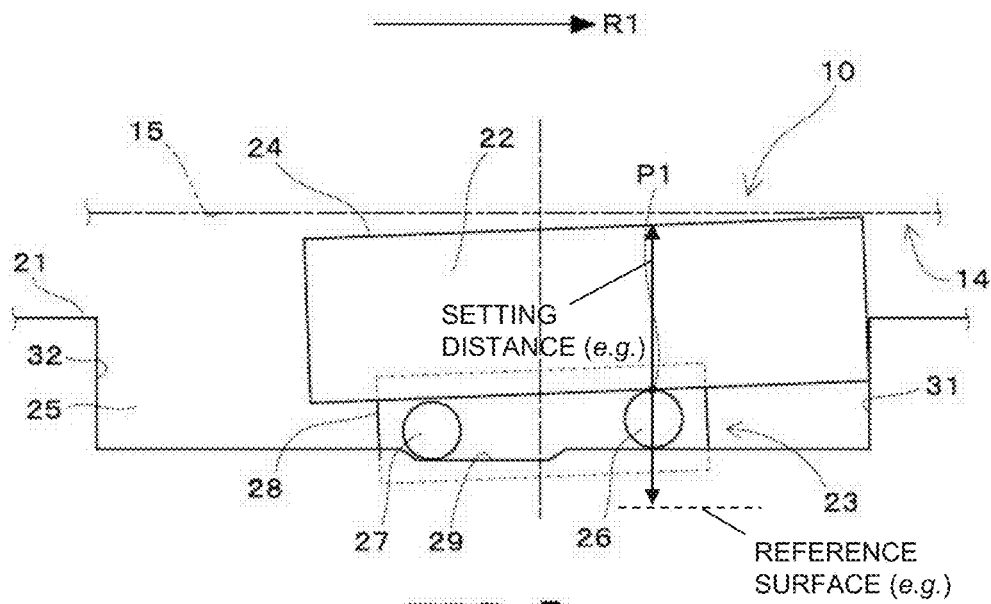
FIG. 5 is a schematic diagram illustrating the essential part of the bearing device according to the first embodiment as viewed from the outer peripheral side of the base plate.
Figure 6:
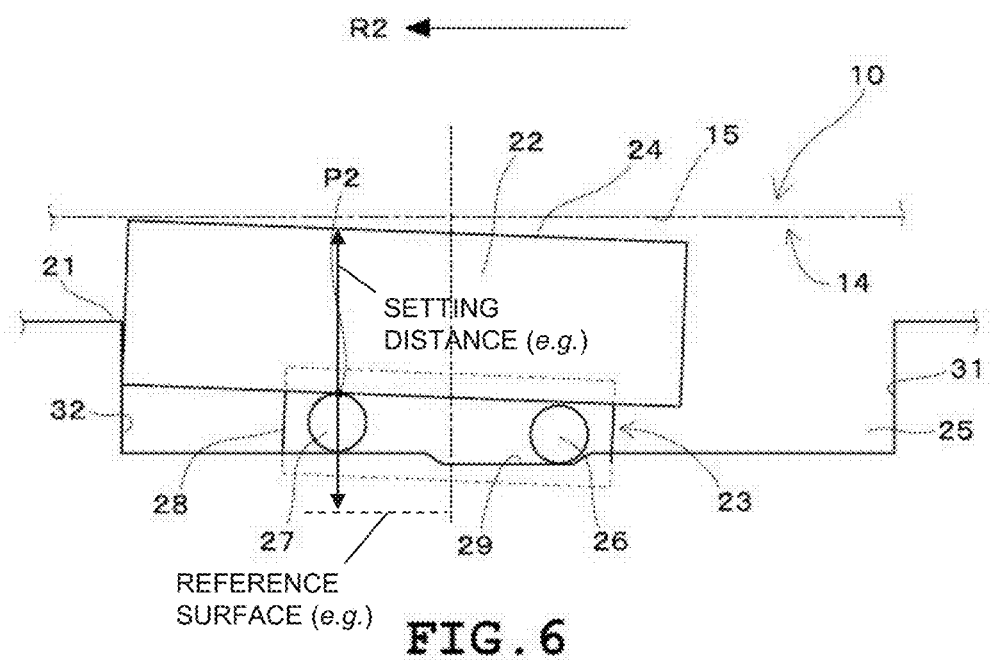
FIG. 6 is a schematic diagram illustrating the essential part of the bearing device according to the first embodiment as viewed from the outer peripheral side of the base plate.

The support member 23 is located between the base plate 21 and the sliding pad 22. The support member 23 in the present embodiment can shift a position of a load supporting point, which serves as a point of supporting a load to be received from the sliding pad 22, in the circumferential direction of the base plate 21 without changing the setting distance. Here, the load supporting point is a point of supporting a load that the sliding pad receives from a collar rotating together with the rotating shaft member 12. As illustrated in FIG. 5 and FIG. 6, the sliding pad 22 changes in its posture in response to a rotating direction of the rotating shaft member 12. In a case illustrated in FIG. 5, the sliding pad 22 supports the load in a load supporting point P1. In a case illustrated in FIG. 6, the sliding pad 22 supports the load in a load supporting point P2. The setting distance corresponds to a distance from a reference surface through the load supporting point P1 or the load supporting point P2 to an end of the sliding pad 22 at the opposite side to the base plate 21. The reference surface is any virtual flat surface perpendicular to the rotating shaft member 12. In other words, the reference surface can be set in any manner as a surface perpendicular to the rotating shaft member 12, such as the sliding surface 15 of the collar member 14 or an end surface of the base plate 21. The support member 23 maintains the setting distance to be constant regardless of the posture of the sliding pad 22. In other words, as illustrated in FIG. 5 and FIG. 6, even when the posture of the sliding pad 22 changes, the distance from any reference surface through the load supporting pint P1 or the load supporting point P2 to the end of the sliding pad 22 is maintained to be constant. It should be noted that the setting distance may be paraphrased by a height of the sliding pad 22. In other words, even when the posture of the sliding pad 22 changes with a change of the rotating shaft member 12 in the rotating direction, the height of the sliding pad 22, that is, the distance from the load supporting point P1 or the load supporting point P2 to the end of the sliding pad 22 the closest to the sliding surface 15 does not change.

The support member 23 has a pair of a roller member 26 and a roller member 27 positioned between the base plate 21 and the sliding pad 22. The roller member 26 and the roller member 27 respectively are located closer to the respective end sides than the center of the sliding pad 22 in the circumferential direction of the base plate 21. The pair of the roller member 26 and the roller member 27 is retained by retaining members 28. The retaining members 28 rotatably support both ends of the roller member 26 and the roller member 27 in a radial direction of the base plate 21. In other words, the retaining members 28 support the axial ends of the roller member 26 and the roller member 27. The retaining members 28 retain a relative position between the roller member 26 and the roller member 27. The roller member 26 and the roller member 27 defining the retaining members 28 correspond to what is called a pivot.

When the rotating shaft member 12 rotates, the collar member 14 having the sliding surface 15 rotates together with the rotating shaft member 12. In a case of the rotating machine 11 in the present embodiment, the rotating shaft member 12 is rotatable in both directions of any forward direction and the backward direction in reverse to the forward direction. For easy explanation, the rotation in the direction of arrow R1 of the collar member 14 having the sliding surface 15 as illustrated in FIG. 1 is defined as the forward direction and the rotation in the direction of arrow R2 is defined as the backward direction.

The base plate 21 has a recessed part 29 in a position facing the sliding pad 22. The recessed part 29 is formed to be recessed in the opposite side from a surface on the sliding pad 22-side in the accommodation room 25 of the base plate 21. When the sliding pad 22 moves in the circumferential direction to the base plate 21, any one of the roller member 26 or the roller member 27 as the support member 23 enters the recessed part 29. For example, when the collar member 14 moves together with the rotating shaft member 12 in the forward direction illustrated in arrow R1 in FIG. 5, a frictional force is applied between the collar member 14 and the sliding pad 22. Accordingly, the sliding pad 22 moves in the direction of arrow R1 in FIG. 5 together with the collar member 14 by the frictional force following the rotation of the collar member 14. As a result, when the rotating shaft member 12 rotates in the forward direction, the roller member 27 positioned on the backward side in the moving direction of the sliding pad 22 enters the recessed part 29. On the other hand, when the sliding pad 22 rotates in the backward direction illustrated in arrow R2 in FIG. 6, the sliding pad 22 moves in the direction of arrow R2 in FIG. 5 together with the collar member 14. Accordingly, when the rotating shaft member 12 rotates in the backward direction, the roller member 26 positioned on the backward side in the moving direction of the sliding pad 22 enters the recessed part 29.

In this way, any one of the roller member 26 or the roller member 27 enters the recessed part 29 depending upon the moving direction of the sliding pad 22. The recessed part 29 is set to a depth to the extent that the roller member 26 or the roller member 27 having entered the recessed part 29 does not support the sliding pad 22. In other words, as illustrated in FIG. 5, when the roller member 27 enters the recessed part 29 by rotation in the forward direction, the sliding pad 22 is supported on a contact point with the roller member 26 as the load supporting point P1. At this time, the roller member 27 positioned on the backward side in the rotating direction does not support the sliding pad 22 by entering the recessed part 29. As a result, the roller member 27 does not support the load of the inclined sliding pad 22. On the other hand, as illustrated in FIG. 6, when the roller member 26 enters the recessed part 29 by rotation in the backward direction, the sliding pad 22 is supported on a contact point with the roller member 27 as the load supporting point P2. At this time, the roller member 26 positioned on the backward side in the rotating direction does not support the sliding pad 22 by entering the recessed part 29. As a result, the roller member 26 does not support the load of the inclined sliding pad 22.

An inclined angle of the sliding pad 22 for formation of an oil film of a lubricant thereon is extremely small, approximately 0.01°, depending upon a condition of a device to be applied. Accordingly, the recessed part 29 is only required to have a depth to the extent that the roller member 26 or the roller member 27 is released from the support of the sliding pad 22 by the inclination of the sliding pad 22. Accordingly, when the recessed part 29 has the depth of approximately 0.1 mm or more, the recessed part 29 can function.

The accommodation room 25 is formed to be recessed in the base plate 21. Accordingly, the sliding pad 22 accommodated in the accommodation room 25 makes contact with a wall part 31 or a wall part 32 of the base plate 21, by which the movement of the sliding pad 22 in the circumferential direction of the base plate 21 is limited. For example, when the sliding pad 22 moves in the direction of arrow R1 in FIG. 5 by the rotation in the forward direction, the sliding pad 22 makes contact with the wall part 31, by which the further movement of the sliding pad 22 is limited. Likewise, when the sliding pad 22 moves in the direction of arrow R2 in FIG. 6 by the rotation in the backward direction, the sliding pad 22 makes contact with the wall part 32, by which the further movement of the sliding pad 22 is limited. In this way, the wall part 31 and the wall part 32 correspond to limiting parts for limiting an excessive movement of the sliding pad 22.

Next, the details of an operation of the bearing device 10 based upon the configuration as described above will be explained.

In the bearing device 10 according to the present embodiment, when the collar member 14 rotates with the rotation of the rotating shaft member 12, a frictional force is applied between the collar member 14 and the sliding pad 22. The sliding pad 22 accommodated in the accommodation room 25 of the base plate 21 moves in the circumferential direction of the base plate 21 in response to the rotating direction of the rotating shaft member 12 by this frictional force. For example, when the rotating shaft member 12 rotates in the forward direction of arrow R1 illustrated in FIG. 5, the sliding pad 22 also moves in the direction of arrow R1 following it. When the sliding pad 22 moves, the roller member 27 positioned on the backward side in the rotating direction enters the recessed part 29 of the base plate 21. When the roller member 27 positioned on the backward side enters the recessed part 29 in this way, a space between the base plate 21 and the sliding pad 22 is supported by the roller member 26 on the forward side. In other words, the roller member 27 on the backward side is released from the support of the sliding pad 22 by entering the recessed part 29. As a result, the sliding pad 22 is inclined on a contact point with the roller member 26 on the forward side as the load supporting point P1.

On the other hand, when the rotating shaft member 12 rotates in the backward direction of arrow R2 illustrated in FIG. 6, the sliding pad 22 also moves in the direction of arrow R2 following it. When the sliding pad 22 moves, the roller member 26 positioned on the backward side in the rotating direction enters the recessed part 29 of the base plate 21. When the roller member 26 positioned on the backward side enters the recessed part 29 in this way, the space between the base plate 21 and the sliding pad 22 is supported by the roller member 27 on the forward side. In other words, the roller member 26 on the backward side is released from the support of the sliding pad 22 by entering the recessed part 29. As a result, the sliding pad 22 is inclined on a contact point with the roller member 27 on the forward side as the load supporting point P2.

In this way, when the sliding pad 22 moves in the circumferential direction following the rotation of the rotating shaft member 12, the sliding pad 22 is inclined at any one of the load supporting point P1 as the contact point with the roller member 26 or the load supporting point P2 as the contact point with the roller member 27 as a supporting point, while receiving the load. In other words, the position of the load supporting point P1 or the load supporting point P2 where the sliding pad 22 receives the load is shifted in the circumferential direction of the base plate 21 with the rotation of the rotating shaft member 12 in the forward direction or the backward direction. Along with it, the other of the roller member 26 or the roller member 27 is released from the support of the sliding pad 22 by entering the recessed part 29. As a result, the sliding pad 22 takes an inclined posture symmetrical between at the rotation time in the forward direction and at the rotation time in the backward direction even when the position of the load supporting point P1 or the load supporting point P2 for receiving the load changes with a change in the rotating direction. Accordingly, even when the position of the sliding pad 22 is changed to the load supporting point P1 or the load supporting point P2, the setting distance does not change. Accordingly, a position of an upper end surface 24 to the sliding surface 15 of the collar member 14 does not change. In other words, the roller member 26 or the roller member 27 present on the side of being released from the support of the sliding pad 22 does not influence the setting distance, that is, the position of the upper end surface 24 of the sliding pad 22 by entering the recessed part 29.

Since the setting distance does not change even when the rotating direction of the rotating shaft member 12 changes, the sliding pad 22 is appropriately inclined in response to the rotating direction. Accordingly, a distance between the sliding surface 15 of the collar member 14 and the sliding pad 22 is maintained to be constant regardless of the rotating direction of the rotating shaft member 12. Accordingly, a stable oil film of lubricating oil is formed between the sliding pad 22 and the collar member 14 as an opposite member. Along with it, since the position of the upper end surface 24 of the sliding pad 22, that is, the position until the sliding surface 15 of the collar member 14 does not change regardless of the rotating direction of the rotating shaft member 12, the load to be applied to the sliding pad 22 is made to be uniform.

For stabilization of the posture as described above, in the present embodiment an offset amount E of the sliding pad 22 satisfies the following relation.

Figure 7:
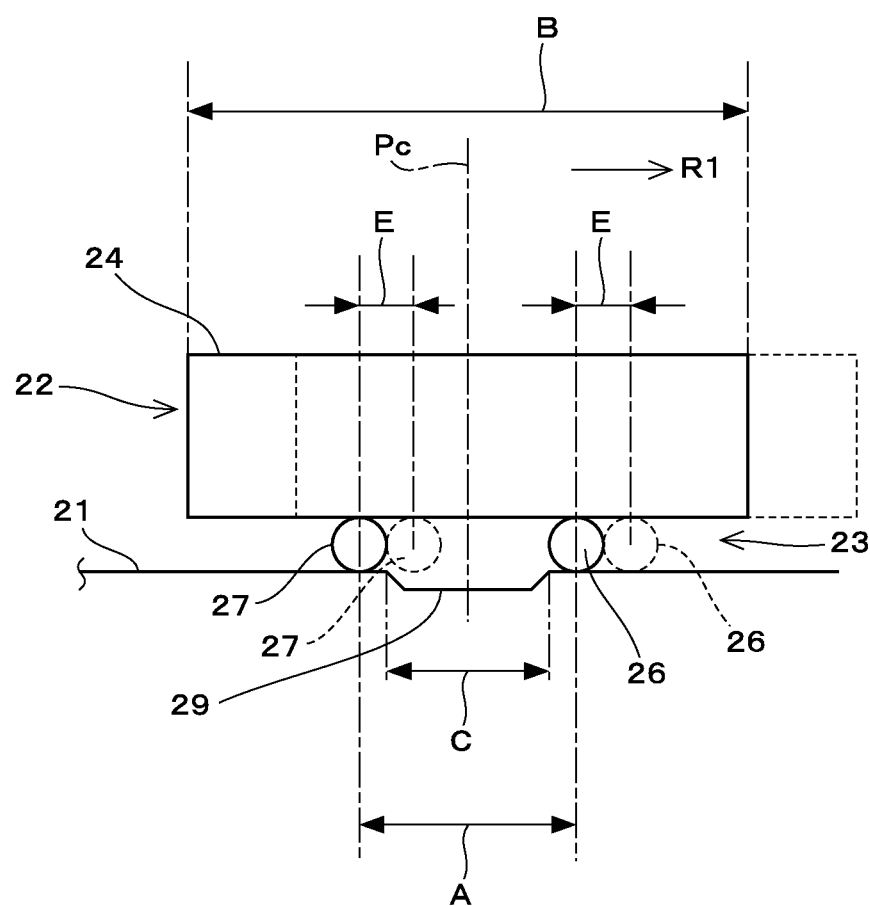
FIG. 7 is a schematic diagram illustrating the essential part of the bearing device according to the first embodiment as viewed from the outer peripheral side of the base plate.

An offset amount in a relative moving direction between the base plate 21 and the sliding pad 22 as illustrated in FIG. 7 is set as an offset amount E as any design value. The offset amount E corresponds to a moving distance of the sliding pad 22 from a position where a center Pc of the sliding pad 22 coincides with a center of the recessed part 29 to a point where any one of the roller member 26 or the roller member 27 enters the recessed part 29 in the relative moving distance between the base plate 21 and the sliding pad 22. When the offset amount E is set, an interval between the pair of the roller member 26 and the roller member 27 in the circumferential direction of the rotating shaft member 12, that is, the base plate 21 is indicated as A. Likewise, a width of the recessed part 29 in the circumferential direction of the base plate 21 is indicated as C.

At this time, a relation of "0<(A−2E)<C<A" is established therebetween.

That is, when the offset amount E is set, the interval A and the width C are set in a range of satisfying the above relation so that both of the roller member 26 and the roller member 27 do not simultaneously enter the recessed part 29 following the movement of the sliding pad 22. For example, when a whole length of the sliding pad 22 in the relative moving direction is indicated as B, the offset amount E is preferably set to "0<E≤0.2B", particularly "E=approximately 0.1 B".

In this way, by setting the interval A between the roller member 26 and the roller member 27, the width C of the recessed part 29 and the offset amount E, when the sliding pad 22 moves in any one of the forward direction or the backward direction, any one of the pair of the roller member 26 and the roller member 27 enters the recessed part 29. In other words, by satisfying the above condition, the roller member 26 receives a load from the sliding pad 22 when the roller member 27 enters the recessed part 29, and meanwhile, the roller member 27 receives a load from the sliding pad 22 when the roller member 26 enters the recessed part 29. In this way, the roller member 26 and the roller member 27 cannot simultaneously enter the recessed part 29.

In the first embodiment explained above, the load supporting point P1 of the sliding pad 22 in the rotation in the forward direction of the rotating shaft member 12 and the load supporting point P2 of the sliding pad 22 in the rotation in the backward direction differ in position. In other words, the position of the load supporting point P1 or the load supporting point P2 changes with the rotating direction of the rotating shaft member 12. Accordingly, the sliding pad 22 is appropriately inclined in response to the rotating direction of the rotating shaft member 12, and the stable oil film of the lubrication oil is formed between the sliding pad 22 and the collar member 14 of the rotating shaft member 12 as the opposite member. Even when the position of the load supporting point P1 or the load supporting point P2 in the sliding pad 22 changes, when the roller member 26 or the roller member 27 released from the support of the sliding pad 22 enters the recessed part 29, the setting distance does not change. In other words, the distance between the upper end surface 24 of the sliding pad 22 and the sliding surface 15 of the collar member 14 does not change. Accordingly, the load to be applied on the sliding pad 22 can be made to be uniform while accommodating the rotation in the forward direction and the backward direction of the rotating shaft member 12.

In the first embodiment, the roller member 26 and the roller member 27 defining the support member 23 are arranged in the respective ends of the sliding pad 22 in the circumferential direction of the rotating shaft member 12, that is, the base plate 21. In this way, one of the pair of the roller member 26 and the roller member 27 acts as the inclined supporting point P1 in the rotation in the forward direction, and the other roller member 27 acts as the inclined supporting point P2 in the rotation in the backward direction. Accordingly, the stable oil film can be formed in response to the rotation of the forward direction and the backward direction of the rotating shaft member 12 with a simple configuration.

In the first embodiment, the base plate 21 has the recessed part 29 on the surface on the sliding pad 22-side. In this way, by disposing the recessed part 29 on the base plate 21, any one of the pair of the roller member 26 and the roller member 27 enters the recessed part 29 in response to the rotating direction of the rotating shaft member 12. The roller member 26 or the roller member 27 having not entered the recessed part 29 acts as the load supporting point P1 or the load supporting point P2 of the sliding pad 22. Further, when the roller member 26 or the roller member 27 that does not act as the load supporting point P1 or the load supporting point P2 enters the recessed part 29, the setting distance becomes constant even when the contact point of the sliding pad 22 is changed to the load supporting point P1 or the load supporting point P2 with a change in the rotating direction of the rotating shaft member 12. Accordingly, the load to be applied to the sliding pad 22 can be made to be uniform, while accommodating the rotation in the forward direction and the backward direction of the rotating shaft member 12.

In the bearing device 10 of the first embodiment, the interval A between the pair of the roller member 26 and the roller member 27, the width C of the recessed part 29 and the offset amount E are set. In this way, even when the position of the load supporting point P1 or the load supporting point P2 changes with a change in the rotating direction of the rotating shaft member 12, one of the pair of the roller member 26 or the roller member 27 that does not serve as the load supporting point P1 or the load supporting point P2 enters the recessed part 29 not to block the inclination of the sliding pad 22. Accordingly, the appropriate posture of the sliding pad 22 can be secured.

In the first embodiment, the support member 23 is made up of the pair of the roller member 26 and the roller member 27. When a force to be applied to the sliding pad 22 changes with a change in the rotating direction of the rotating shaft member 12, the roller member 26 and the roller member 27 smoothly guide the sliding pad 22 to change the load supporting point P1 or the load supporting point P2. Accordingly, the inclination of the sliding pad 22 can be easily changed in response to the change in the rotating direction of the rotating shaft member 12.

In the first embodiment, the relative position of the pair of the roller member 26 and the roller member 27 is retained by the retaining member 28. In this way, the positional relation of the pair of the roller member 26 and the roller member 27 can be retained to be constant.

Second Embodiment

Figure 8A:
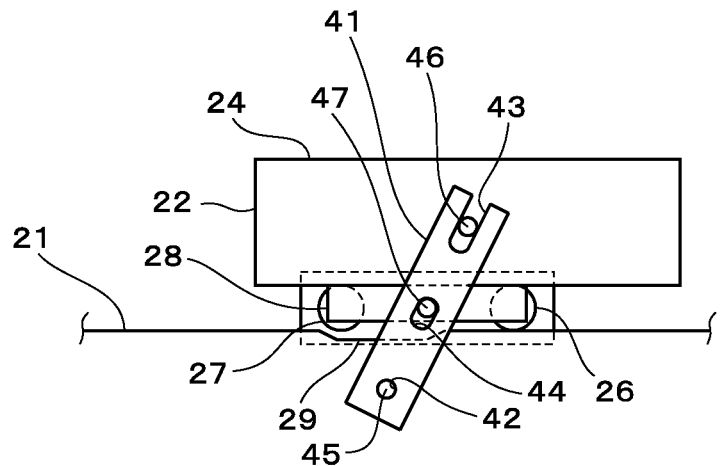
FIG. 8A is a schematic diagram illustrating an essential part of a bearing device according to a second embodiment as viewed from an outer peripheral side of a base plate.
Figure 8B:
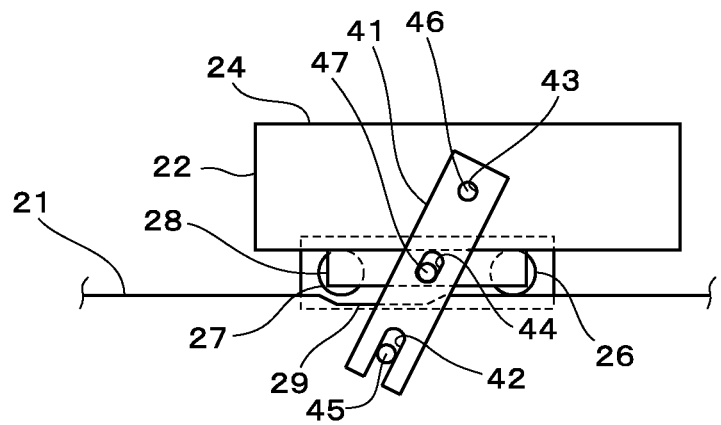
FIG. 8B is a schematic diagram illustrating the essential part of the bearing device according to the second embodiment as viewed from the outer peripheral side of the base plate.
Figure 8C:
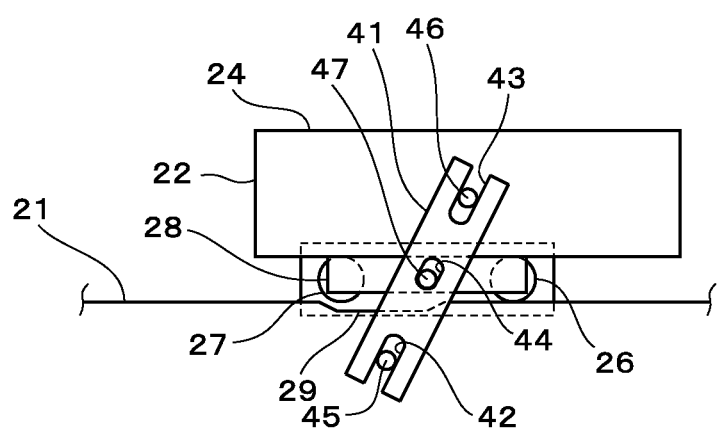
FIG. 8C is a schematic diagram illustrating the essential part of the bearing device according to the second embodiment as viewed from the outer peripheral side of the base plate.

A bearing device according to a second embodiment is illustrated in FIG. 8A, FIG. 8B and FIG. 8C.

In the second embodiment, as illustrated in FIG. 8A, FIG. 8B and FIG. 8C a bearing device 10 is provided with a positioning member 41.

The positioning member 41 retains a mutual positional relation between a base plate 21, a sliding pad 22 and a support member 23. Specifically the positioning member 41 has a guide part 42, a guide part 43 and a guide part 44 as illustrated in FIG. 8A. The guide part 42 meshes with a projection 45 disposed in the base plate 21. The guide part 43 meshes with a projection 46 disposed in the sliding pad 22. Further, the guide part 43 meshes with a projection 47 disposed in a retaining member 28 retaining a pair of roller member 26 and roller member 27. The guide part 42 and the projection 45, the guide part 43 and the projection 46, the guide part 44 and the projection 47 each mesh to be relatively rotatable. Accordingly, the positional relation of the sliding pad 22, and the roller member 26 and the roller member 27 defining the support member 23 to the base plate 21 is retained by the positioning member 41.

The guide part 42, the guide part 43 and the guide part 44 of the positioning member 41 each may be, as illustrated in FIG. 8B and FIG. 8C, changed in any shape such as a circular hole shape, an oblong shape or an open oblong shape as long as the function of retaining the positional relation is made possible.

The second embodiment is provided with the positioning member 41. In this way, a mutual positional relation of the base plate 21, the sliding pad 22, and the roller member 26 and the roller member 27 defining the support member 23 is retained to be constant. Accordingly, the position of the sliding pad 22 to the base plate 21, and the change in the posture of the sliding pad 22 with the change in the rotating direction of the rotating shaft member 12 can be controlled within a desired range.

Other Embodiments

The bearing devices in the embodiments as described above may be modified as follows.

Figure 9:
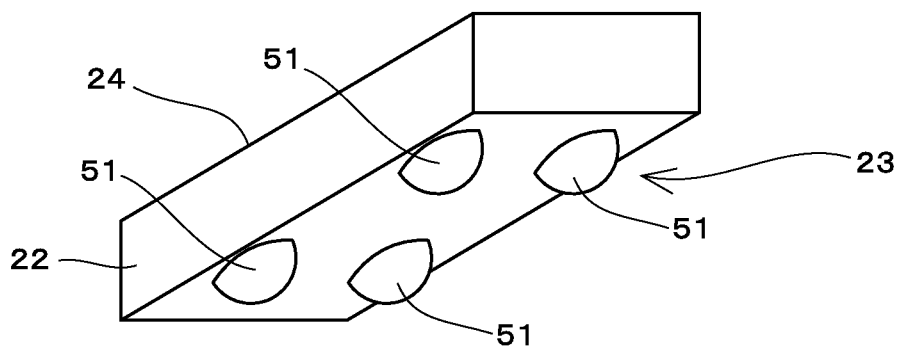
FIG. 9 is a schematic perspective view illustrating a sliding pad in a bearing device according to another embodiment.

As illustrated in FIG. 9 a support member 23 may be slide members 51 assembled integrally with a sliding pad 22. In this case, the slide member 51 is formed in a semispherical or spherical shape projecting from the sliding pad 22 toward the base plate 21. The slide member 51 is located in each of the ends of the sliding pad 22 in the circumferential direction of the base plate 21. In this way, the support member 23 may be configured to slide and guide the sliding pad 22 instead of being configured to rotate and guide the sliding pad 22. Further, the slide members 51 are formed integrally with the sliding pad 22, thus making it possible to omit the retaining member 28 in the first embodiment.

Figure 10:
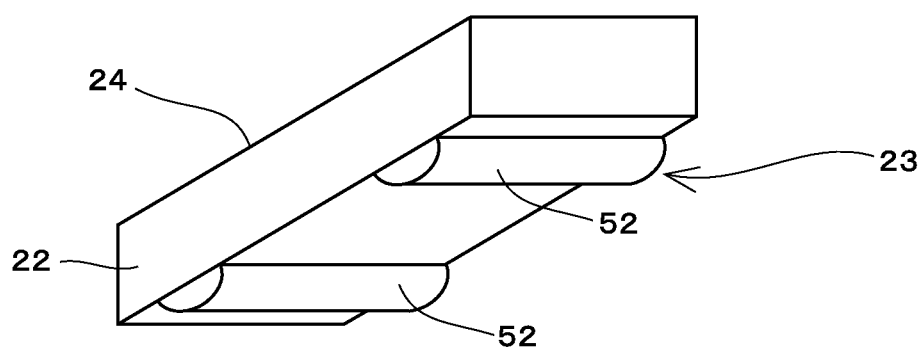
FIG. 10 is a schematic perspective view illustrating a sliding pad in a bearing device according to another embodiment.
Figure 11:
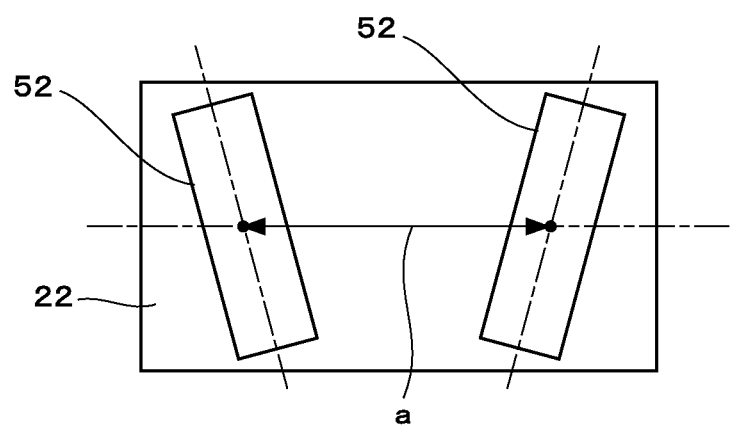
FIG. 11 is a schematic diagram illustrating a sliding pad in a bearing device according to another embodiment as viewed from a base plate side.

In addition, the slide members 52 defining a support member 23 as illustrated in FIG. 10 may be formed in a columnar shape projecting from a sliding pad 22 toward a base plate 21 side. In this way, the sliding pad 22 slides and is guided by the columnar slide members 52. Further, the slide members 52 may be, as illustrated in FIG. 11, formed radially from a rotating shaft member 12, that is, a center of a base plate 21. In this way, in a case of radially forming the slide members 52, an interval between the slide members 52 corresponds to a distance "a" in a radial center of the base plate 21.

Figure 12A:
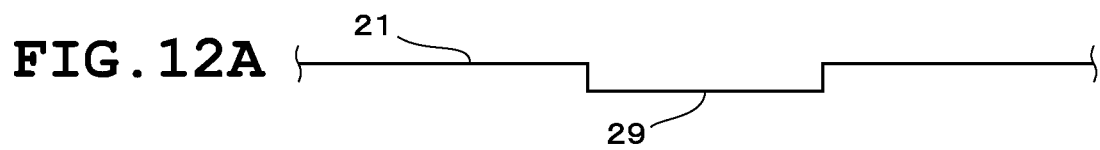
FIG. 12A is a schematic diagram illustrating a recessed part formed in a base plate of a bearing device according to another embodiment.
Figure 12B:
FIG. 12B is a schematic diagram illustrating a recessed part formed in a base plate of a bearing device according to another embodiment.
Figure 12C:
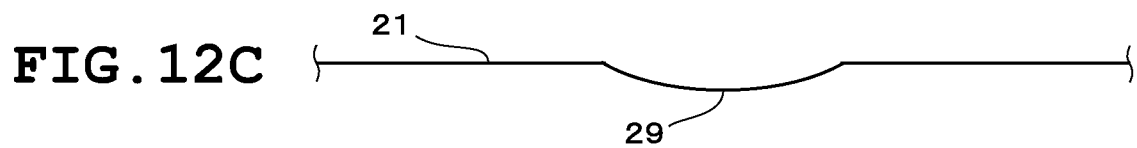
FIG. 12C is a schematic diagram illustrating a recessed part formed in a base plate of a bearing device according to another embodiment.
Figure 12D:
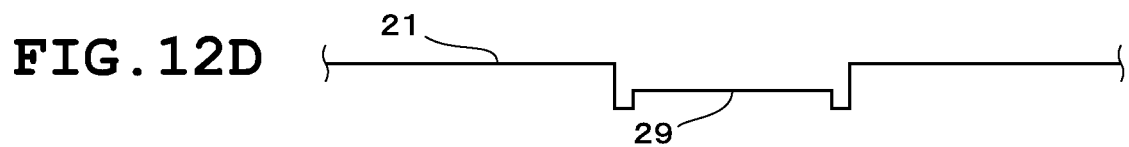
FIG. 12D is a schematic diagram illustrating a recessed part formed in a base plate of a bearing device according to another embodiment.

A shape of a recessed par 29 formed in a base plate 21 is, as illustrated in FIG. 12A, FIG. 12B, FIG. 12C and FIG. 12D, not necessarily limited to the flat surface as long as the shape does not block the movement of a support member 23. In other words, the recessed part 29 is not limited to the flat bottom surface formed between flat inclined surfaces as illustrated in FIG. 1. The recessed part 29 may be, as illustrated in FIG. 12A, made up of flat recessed surfaces alone. The inclined surfaces located in both sides of a bottom surface of the recessed part 29 each are not limited to the flat surface, but a curved surface. A recessed part 29 may be, as illustrated in FIG. 12B, made up of recessed inclined surfaces alone. A recessed part 29 may be, as illustrated in FIG. 12C, made up of a recessed curved surface alone. Further, a recessed part 29 may, as illustrated in FIG. 12D, have groove-shaped portions in both ends of a bottom surface.

Figure 13:
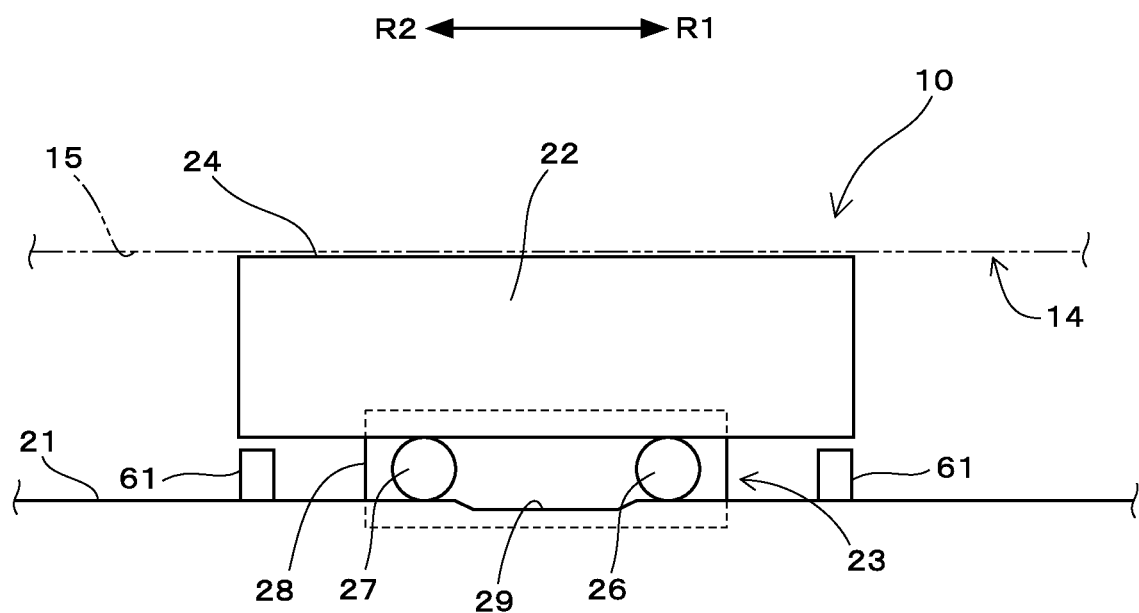
FIG. 13 is a schematic diagram illustrating an essential part of a bearing device according to another embodiment as viewed from an outer peripheral side of a base plate.

A limiting part may, as illustrated in FIG. 13, be projecting parts 61 limiting the movement of a support member 23 instead of the wall part 31 or the wall part 32. In other words, the limiting part is not limited to the wall part 31 or the wall part 32 disposed in each of both ends of the accommodation room 25 in the circumferential direction of the base plate 21 as illustrated in the first embodiment, but may be formed in any shape as long as the shape can limit the movement of the support member 23.

The present invention explained above is not limited to the embodiments explained above, but may be applied to various kinds of embodiments within a range not departing from the subject.

For example, each of the embodiments explained above is explained as an example applied as the thrust bearing for axially supporting the rotating shaft member 12 in the bearing device 10. The bearing device 10 in each of the embodiments may be applied to a journal bearing for supporting the rotating shaft member 12 from the radial outside.

In the above description, the load supporting point is viewed as a point in a case of viewing the sliding pad 22 from a lateral side, and is therefore expressed as a "point". Also in a case of using the wheel-shaped roller members 26, 27 as in the case of the first embodiment, the load supporting point serves as a point in a lateral view. However, in a case of using a bar-shaped roller member, the load supporting point is possibly formed in a linear shape extending in a radial direction of the rotating shaft member 12. In this way, the load supporting point is described using the expression of the "point", but may be formed in the linear shape depending upon a shape of the support member 23.

What is claimed is:
1. A bearing device for supporting a rotating shaft member, comprising:
   a base plate;
   a plurality of sliding pads that are located in the base plate and are movable relative to the base plate in a circumferential direction of the rotating shaft member; and
   a support member that is located between the base plate and the sliding pad and shifts a position of a load supporting point in a circumferential direction of the base plate, the load supporting point serving as a point for supporting a load received from the sliding pad, wherein the support member comprises a pair of support members respectively arranged closer to end sides than a center of the sliding pad in the circumferential direction of the rotating shaft member, the base plate includes a recessed part on a surface, any one of the pair of the support members being allowed to enter the recessed part by a relative movement of the sliding pad to the base plate, in a relative movement direction between the base plate and the sliding pad, a distance equivalent to half a movement distance of the sliding pad from a position where a center of the sliding pad coincides with a center of the recessed part to a position where one of the support members enters the recessed part is defined as an offset amount E, an interval A between the support members in the circumferential direction of the rotating shaft member and a width C of the recessed part in the circumferential direction of the rotating shaft member satisfy a relation of $0<(A-2E)<C<A$, any virtual flat surface perpendicular to the rotating shaft member is considered as a reference surface, and a distance from the reference surface to an end of the sliding pad at the opposite side to the base plate on a line which goes through the load supporting point in an axis direction of the rotating shaft member is defined as a setting distance, a position of the load supporting point is shifted in the circumferential direction of the base plate in response to rotation of the rotating shaft member in the forward direction or backward direction, while the setting distance remains approximately constant as the rotating shaft member rotates either to the forward direction or to the backward direction, because the inclination of the sliding pad is symmetric between the rotating shaft member rotating to the forward direction and the rotating shaft member rotating to the backward direction.

2. The bearing device according to claim 1, wherein the pair of support members is formed of a pair of roller members located between the base plate and the sliding pad.

3. The bearing device according to claim 2, further comprising:

a retaining member that rotatably supports both ends of the pair of the roller members in a radial direction of the rotating shaft member and retains a relative position of the pair of the roller members.

4. The bearing device according to claim 3, further comprising:

a positioning member for retaining a positional relation between the base plate, the sliding pad and the retaining member.

5. The bearing device according to claim 1, wherein the pair of support members includes a pair of slide members located on a base plate side of the sliding pad.

6. The bearing device according to claim 1, further comprising:

a limiting part that is provided in the base plate to limit an excessive movement of the sliding pad.

7. The bearing device according to claim 1, further comprising a thrust bearing for supporting the rotating shaft member in an axial direction of the rotating shaft member.

8. A rotating machine comprising:

the bearing device according to claim 1; and a rotor rotating integrally with the rotating shaft member.

* * * * *